United States Patent
Lee et al.

(10) Patent No.: US 9,258,404 B2
(45) Date of Patent: Feb. 9, 2016

(54) MOBILE TERMINAL AND METHOD OF CONTROLLING THE SAME

(75) Inventors: Jiyoung Lee, Seoul (KR); Hyehyun Hwang, Seoul (KR); Changgui Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 13/553,695

(22) Filed: Jul. 19, 2012

(65) Prior Publication Data

US 2013/0035122 A1    Feb. 7, 2013

(30) Foreign Application Priority Data

Aug. 3, 2011 (KR) .................... 10-2011-0077180

(51) Int. Cl.
*H04Q 7/10* (2006.01)
*H04M 1/725* (2006.01)

(52) U.S. Cl.
CPC ................................ *H04M 1/72547* (2013.01)

(58) Field of Classification Search
CPC ........ H04W 4/12; H04W 4/16; G06F 17/243; H04M 1/72552
USPC ............ 455/412.1, 412.2, 414, 466; 345/156, 345/184, 440, 467, 681, 684
See application file for complete search history.

(56) References Cited

U.S. PATENT DOCUMENTS

| | | | | |
|---|---|---|---|---|
| 5,802,466 | A * | 9/1998 | Gallant et al. | 455/413 |
| 6,799,033 | B2 * | 9/2004 | Kanefsky | 455/412.1 |
| 7,003,308 | B1 * | 2/2006 | Fuoss et al. | 455/466 |
| 8,453,057 | B2 * | 5/2013 | Stallings et al. | 715/726 |
| 2004/0174964 | A1 | 9/2004 | Koch | |
| 2007/0242656 | A1 * | 10/2007 | Klassen et al. | 370/352 |
| 2008/0216022 | A1 | 9/2008 | Lorch et al. | |
| 2010/0223314 | A1 | 9/2010 | Gadel et al. | |
| 2011/0105160 | A1 * | 5/2011 | Tysowski | 455/466 |
| 2012/0088527 | A1 * | 4/2012 | Roka | 455/466 |
| 2012/0274597 | A1 * | 11/2012 | Forstall et al. | 345/173 |
| 2013/0097260 | A1 * | 4/2013 | Lee | 709/206 |
| 2013/0172026 | A1 * | 7/2013 | Odell et al. | 455/466 |

FOREIGN PATENT DOCUMENTS

GB    2470790    12/2010

OTHER PUBLICATIONS

European Patent Office Application Serial No. 12005393.9, Search Report dated Aug. 13, 2015, 7 pages.

* cited by examiner

*Primary Examiner* — Patrick Edouard
*Assistant Examiner* — Julio Perez
(74) *Attorney, Agent, or Firm* — Lee, Hong, Degerman, Kang & Waimey (57) ABSTRACT

The present invention relates to a mobile terminal and a method of controlling the same. A result, which will be displayed at a destination when a message created on a message creation screen is sent to the destination, is provided in advance. Messages having various formats can be generated on one message creation screen. Various functions relating to the message creation are provided.

23 Claims, 11 Drawing Sheets

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2011-0077180, filed Aug. 3, 2011, the contents of which are hereby incorporated by reference herein in its entirety.

BACKGROUND

1. Field

Embodiments of the present invention may relate to a mobile terminal and, more particularly, to a mobile terminal and a method of controlling the same to provide various functions relating to messages having various formats for user convenience.

2. Background

With rapid development of hardware and software technologies relating to various electronic devices including a mobile terminal and various network technologies supporting data communication, the mobile terminal can transmit and receive various types of messages having different formats.

Accordingly, development of a user interface capable of providing convenience to users for transmission/reception of various messages is urgently needed.

SUMMARY

An object of the present invention is to provide a mobile terminal and a method of controlling the same to provide a result displayed at a destination when a message created on a message creation screen is transmitted to the destination.

Another object of the present invention is to provide a mobile terminal and a method of controlling the same to create messages having various formats on one message creation screen.

Another object of the present invention is to provide a mobile terminal and a method of controlling the same to provide various functions relating to the above objects for user convenience.

In accordance with one aspect of the invention, a mobile terminal includes a display configured to display a message creation screen for creating a message to be transmitted to a specific destination, and a controller configured to display a result, which will be displayed at the specific destination when a message created on the message creation screen is sent to the specific destination, on the display in advance according to a predetermined instruction.

In accordance with another aspect of the invention, a method of controlling a mobile terminal includes displaying a message creation screen for creating a message to be sent to a specific destination; inputting a message; and providing a result, which will be displayed at the specific destination when a message created on the message creation screen is sent to the specific destination, in advance upon receipt of a predetermined instruction.

According to the mobile terminal and method of controlling the same according to embodiments of the present invention, a result, displayed at a destination when a message created on the message creation screen is transmitted to the destination, is provided in advance such that a user can previously check the result which will be seen by a person who receives the message.

Furthermore, it is possible to create messages having various formats on one message creation screen and provide various functions relating thereto such that the user can be provided with convenience.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present invention will now be described more fully with reference to the accompanying drawings, in which certain embodiments of the invention are illustrated. The invention may, however, be embodied in many different forms and should not be construed as being limited to the embodiments set forth herein; rather, these embodiments are described and/or illustrated so that this disclosure will be more thorough and complete, and will more fully convey the aspects of the invention to those skilled in the art.

Hereinafter, a mobile terminal according to embodiments of the present invention will be described below in more detail with reference to the accompanying drawings. In the following description, the suffixes "module" and "unit" are used in reference to components of the mobile terminal for convenience of description and do not have meanings or functions different from each other.

The mobile terminals described herein may include a cellular phone, a smart phone, a laptop computer, a digital broadcasting terminal, a personal digital assistant (PDA), a portable multimedia player (PMP), and a navigation system.

Figure 1:
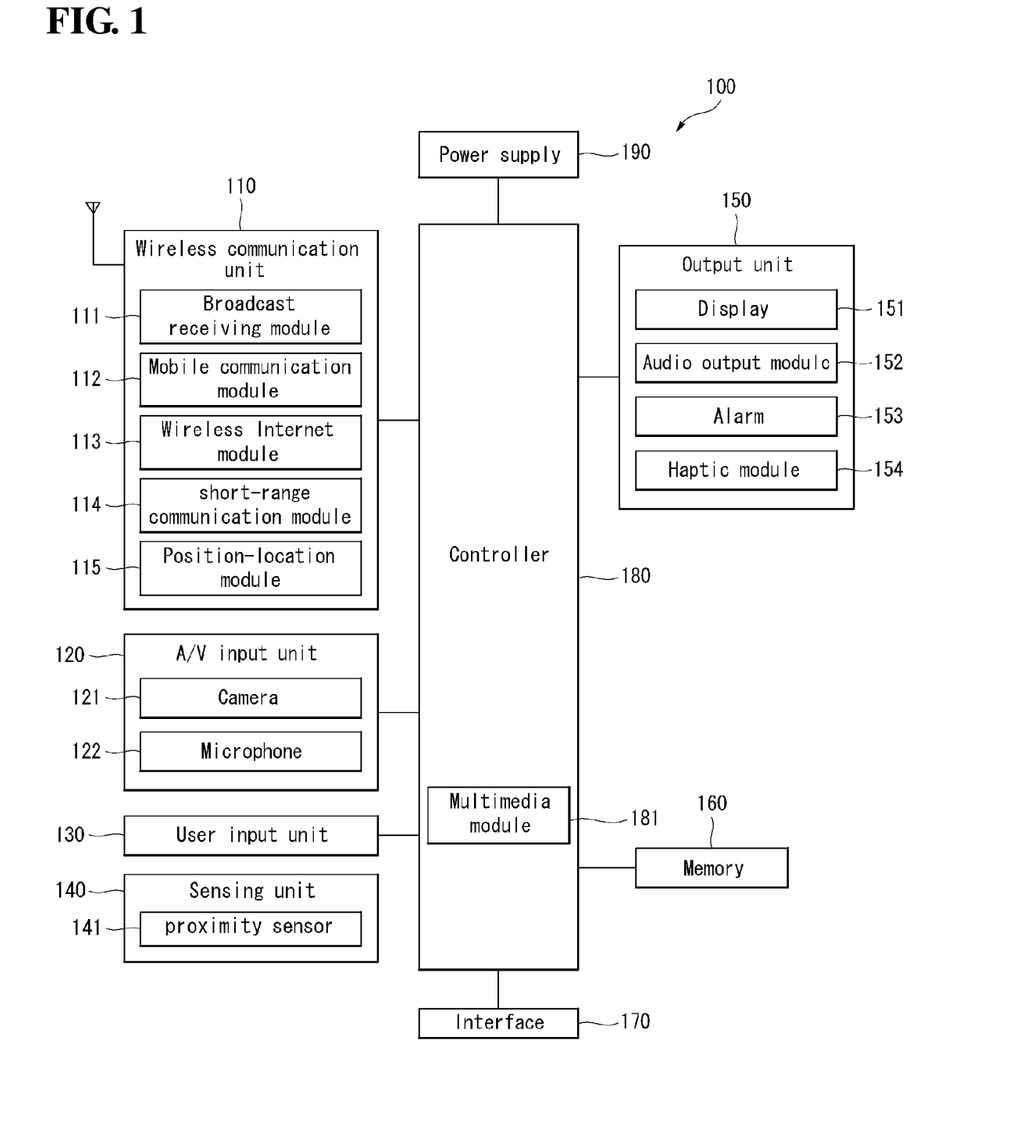
FIG. 1 is a block diagram of a mobile terminal according to an example embodiment.

FIG. 1 is a block diagram of a mobile terminal 100 in accordance with an example embodiment.

The mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141, a motion detecting sensor 142, a brightness detecting sensor 143, a distance detecting sensor 144, and/or a heat detecting sensor 145. Details of the proximity sensor 141 and the other sensors 142, 143, 144 and 145 may be explained below.

The motion detecting sensor 142 may detect a motion state of the mobile terminal 100 by an external force such as an external shock, an external vibration and/or the like. The motion detecting sensor 142 may detect a motion extent. The motion detecting sensor 142 may be provided with a rotational body and detect a motion of the terminal by detecting a property of a mechanical movement of the rotational body. Based on speed, acceleration and direction of the motion, the motion detecting sensor 142 may detect either the motion extent or a motion pattern and then output the detected one to the controller 180. The motion detecting sensor 142 may include a gyrosensor.

The brightness detecting sensor 143 may detect a brightness of light around the mobile terminal 100 and then output the detected brightness to the controller 180.

The distance detecting sensor 144 may include an ultrasonic sensor or the like. The distance detecting sensor 144 may measure a distance between the mobile terminal 100 and a user and then output the detected distance to the controller 180.

The heat detecting sensor 145 may be provided around the display 151 of the terminal body. The heat detecting sensor 145 may detect the temperature on user's contact with the terminal body and then output the detected temperature to the controller 180.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified into the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable.

For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character an/or recognizing a picture drawing input performed on the touchscreen as an image.

The power supply 190 may receive an external or internal power and then supply the power required for operations of the respective elements under control of the controller 180.

Embodiments of the present invention explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Embodiments of the present invention will now be described.

For description convenience, it is assumed that the display 151 is a touchscreen in the following description. As described above, the touchscreen 151 may execute both an information display function and an information input function. However, the present invention is not limited thereto. Touch referred to in the specification may include contact touch and proximity touch.

Figure 2:
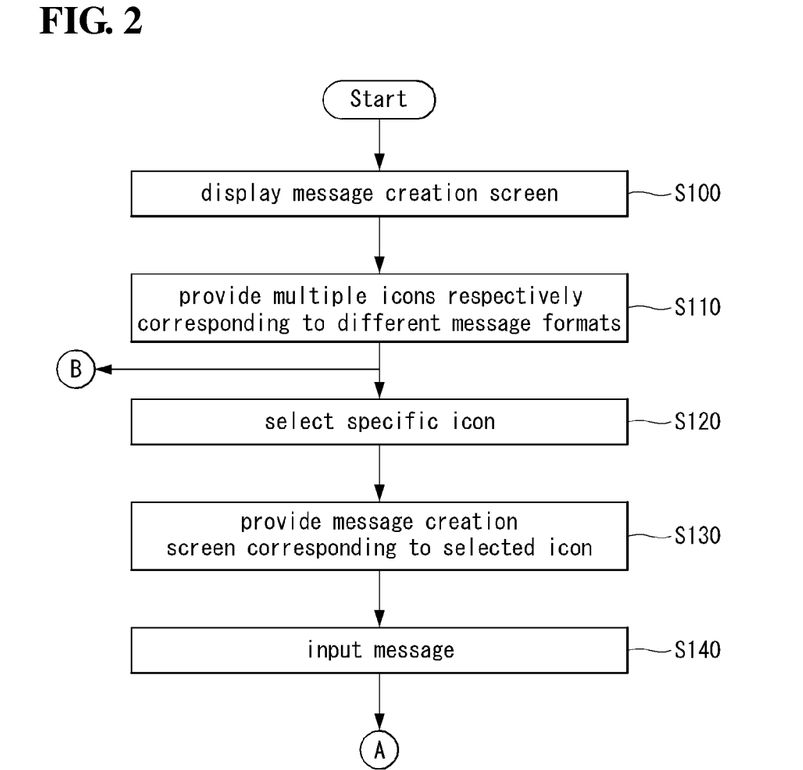
FIG. 2 is a flowchart illustrating a method of controlling a mobile terminal according to a first embodiment of the present invention.

FIG. 2 is a flowchart illustrating a method of controlling a mobile terminal according to a first embodiment of the present invention and FIGS. 3 to 8 are views for explaining the method of controlling a mobile terminal according to the first embodiment of the present invention.

The method of controlling a mobile terminal according to the first embodiment of the present invention may be implemented in the mobile terminal 100 described with reference to FIG. 1. The method of controlling a mobile terminal according to the first embodiment and operations of the mobile terminal 100 to implement the same will now be described in detail with reference to drawings.

Referring to FIG. 2, the controller 180 may display a message creation screen (S100). The controller 180 may provide a plurality of icons respectively corresponding to different message formats to the message creation screen (S110).

Figure 3:
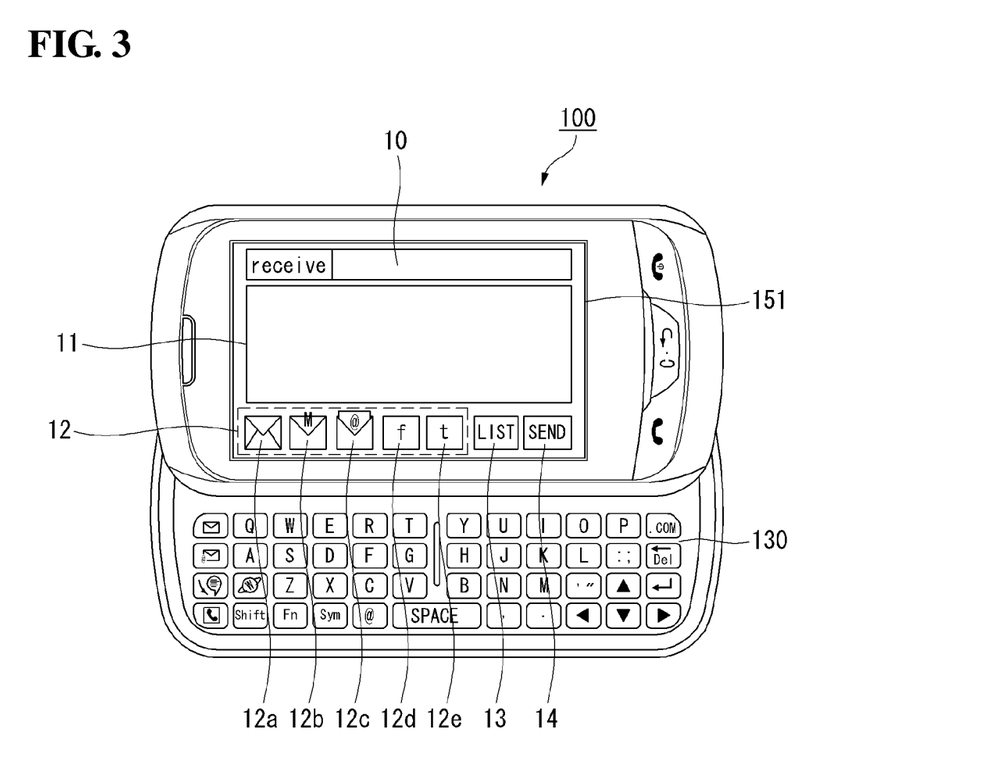
FIGS. 3 to 5 are views for explaining the method of controlling a mobile terminal according to the first embodiment of the present invention.

FIG. 3 shows an example of the message creation screen.

Referring to FIG. 3, the message creation screen may include a destination input window 10 to which a specific destination is input and a message input window 11 to which a message is input.

The specific destination may correspond to an Internet address or a phone number corresponding to one of an SMS (Short Message System) message, an MMS (Multimedia Messaging System) message, an IM (Instant Message), an SNS (Social Network System) message and e-mail.

That is, messages described in the specification include one of an SMS message, MMS message, IM, SNS message and e-mail.

The message creation screen shown in FIG. 3 includes a plurality of icons 12 which can be respectively selected and respectively correspond to different message formats.

For example, the plurality of icons 12 may include an SMS icon 12a corresponding to an SMS message format, an MMS icon 12b corresponding to an MMS message format, an e-mail icon 12c corresponding to an e-mail message format, and SMS icons 12d and 12e corresponding to an SNS message format.

The message creation screen shown in FIG. 3 may include a list icon 13 corresponding to a function of displaying a list of transmitted messages and a send icon 14 corresponding to a function of sending a created message to a destination input to the destination input window 10, which will be described later.

The controller 180 may receive a signal of selecting a specific icon from the plurality of icons respectively corresponding to the different message formats (S120).

It is assumed that the message creation screen shown in FIG. 3 corresponds to a message creation screen for generating an SMS message.

Figure 4:
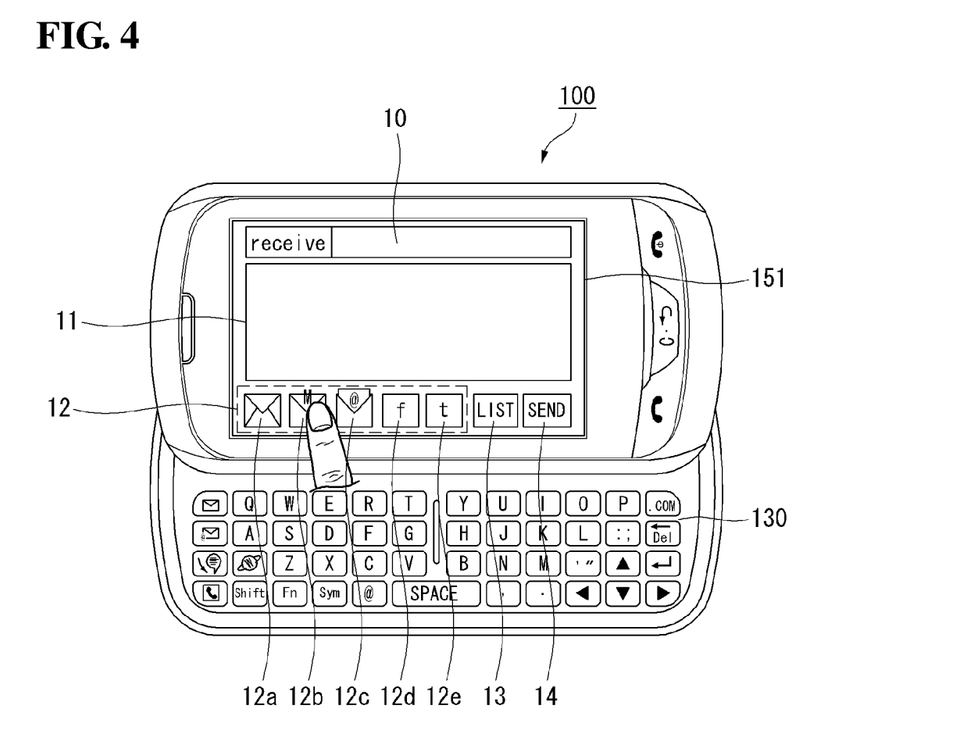

Referring to FIG. 4, a user can select the MMS icon 12b by touching the MMS icon 12b with a finger.

The controller 180 may display a message creation screen corresponding to the selected icon on the touchscreen 151 upon selection of the specific icon (S130).

Figure 5:
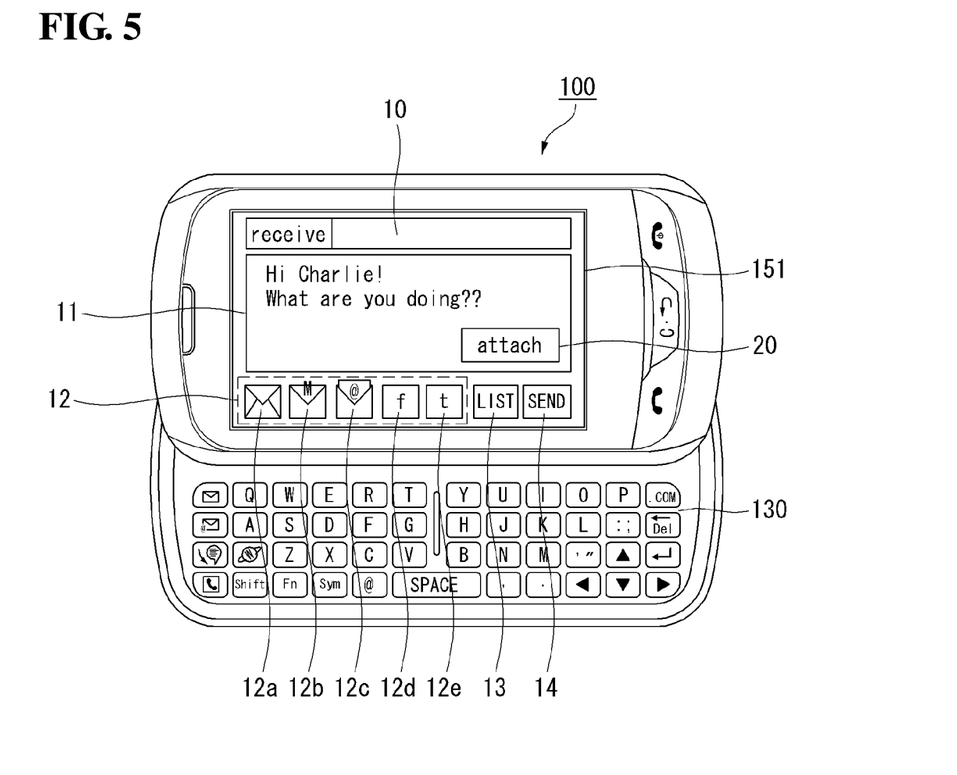

FIG. 5 shows an example of a message creation screen for generating an MMS message, which is displayed when the user selects the MMS icon 12b in the state of FIG. 4.

Referring to FIG. 5, the message creation screen for generating an MMS message includes an attachment icon 20 corresponding to a function of attaching a file.

When the user input a message through the user input unit 130 (S140), the controller 180 may display the input message in the message input window 11.

Figure 6:
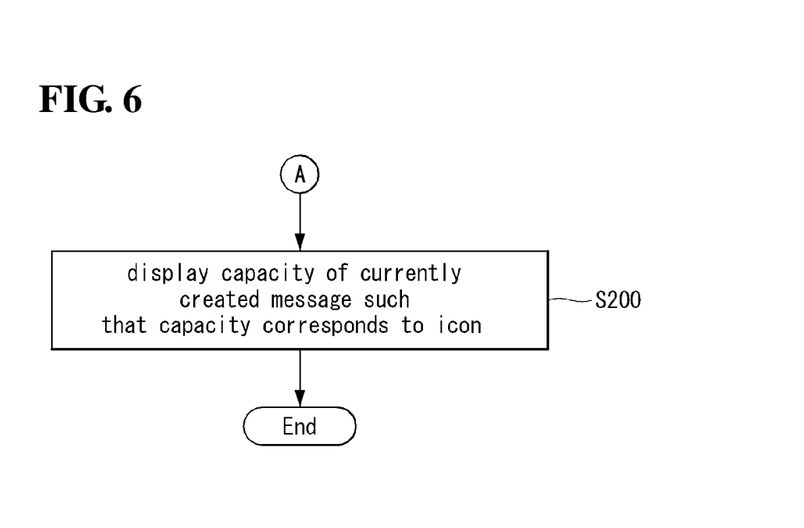
FIG. 6 is a flowchart illustrating a method of controlling a mobile terminal according to a second embodiment of the present invention.
Figure 7:
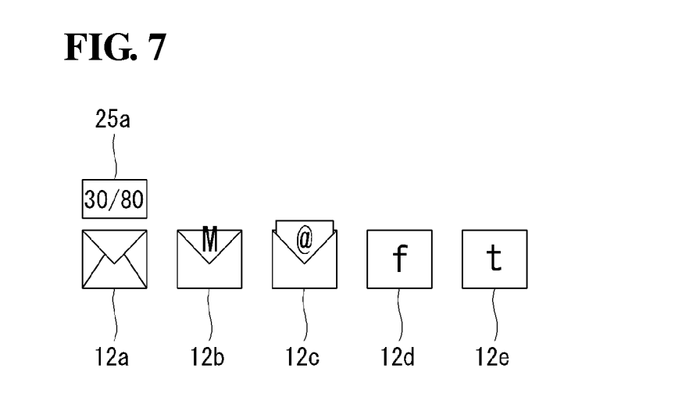
FIGS. 7 and 8 are views for explaining the method of controlling a mobile terminal according to the second embodiment of the present invention.
Figure 8:
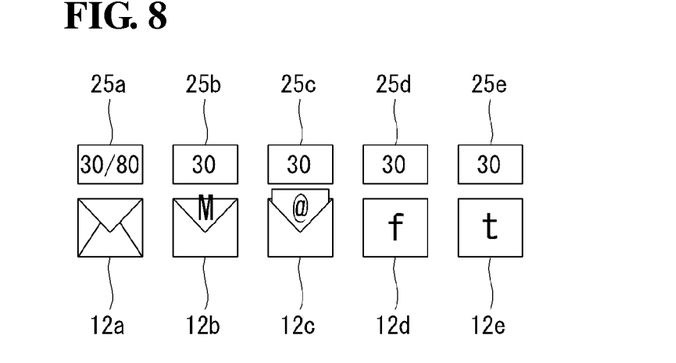

FIG. 6 is a flowchart illustrating a method of controlling a mobile terminal according to a second embodiment of the present invention and FIGS. 7 and 8 are views for explaining the method of controlling a mobile terminal according to the second embodiment of the present invention.

The method of controlling a mobile terminal according to the second embodiment of the present invention may be implemented in the mobile terminal 100 described with reference to FIG. 1. The method of controlling a mobile terminal according to the second embodiment and operations of the mobile terminal 100 to implement the same will now be described in detail with reference to drawings. The second embodiment may be based on the first embodiment of the present invention.

Referring to FIG. 6, the controller 180 may display capacity of a currently created message such that the capacity corresponds to an icon (S200).

In this case, the controller 180 may display the message capacity for an icon corresponding to a currently selected message format.

Referring to FIG. 7, when the currently selected message format corresponds to the SMS message format, the controller 180 can display SMS capacity 25a in such a manner that the SMS capacity 25a corresponds to the SMS icon 12a. The SMS capacity 25a may include capacity "30" of the currently input message and a capacity limit "80". If the capacity of the input message exceeds the capacity limit "80", the current message format can be automatically changed from the SMS message format to the MMS message format.

The controller 180 may display the message capacity for all message icons including the message icon corresponding to the currently selected message format.

Referring to FIG. 8, the controller 180 can display the message capacity 25a, 25b, 25c, 25d and 25e for all the icons 12a, 12b, 12c, 12d and 12e respectively corresponding to the different message formats, which are displayed on the message creation screen.

Figure 9:
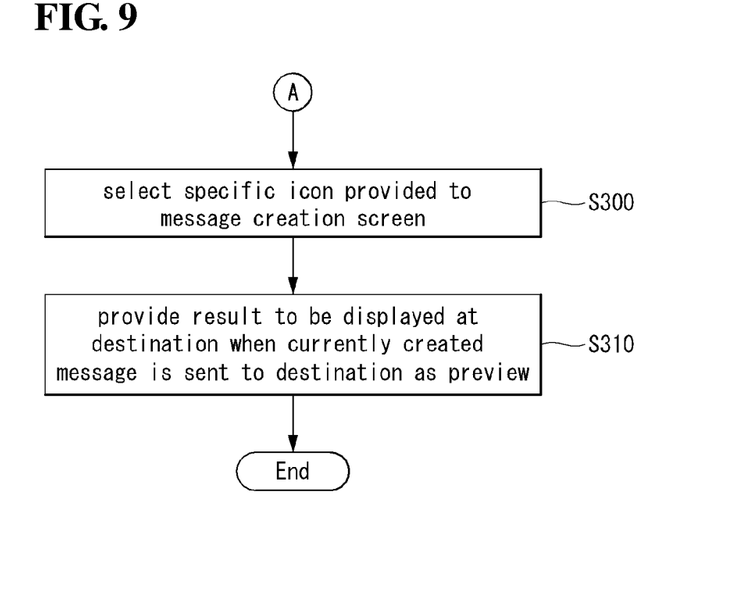
FIG. 9 is a flowchart illustrating a method of controlling a mobile terminal according to a third embodiment of the present invention.
Figure 10:
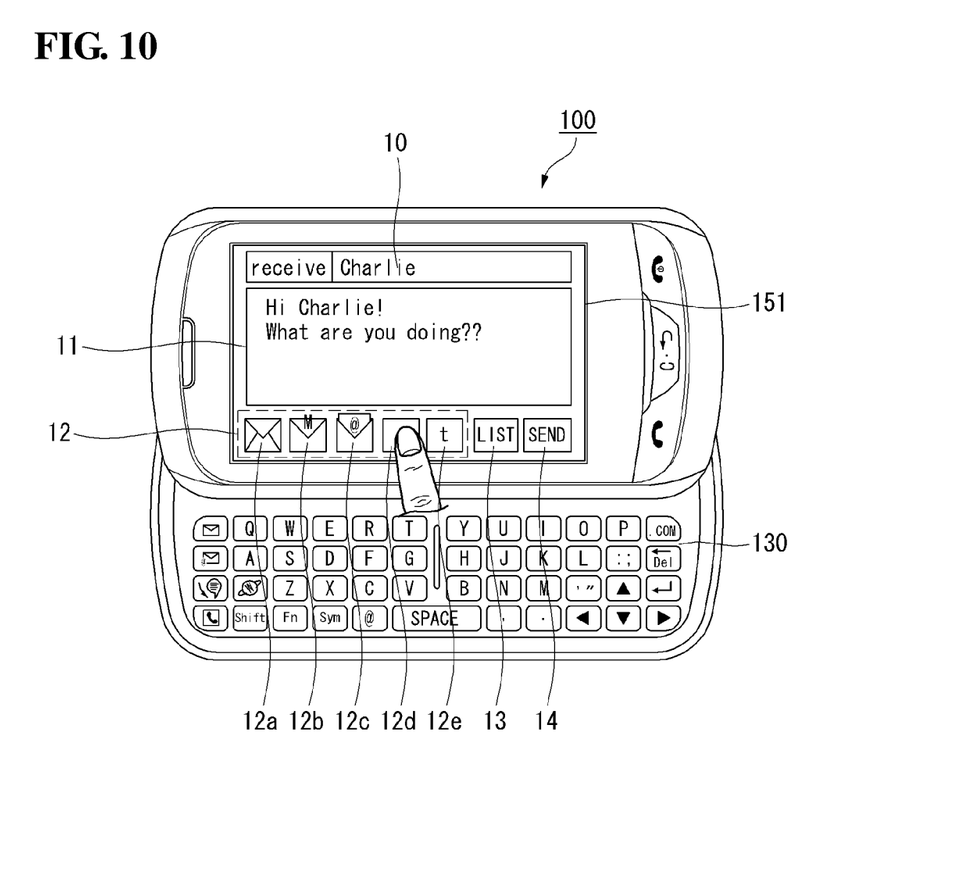
FIGS. 10 and 11 are views for explaining the method of controlling a mobile terminal according to the third embodiment of the present invention.
Figure 11:
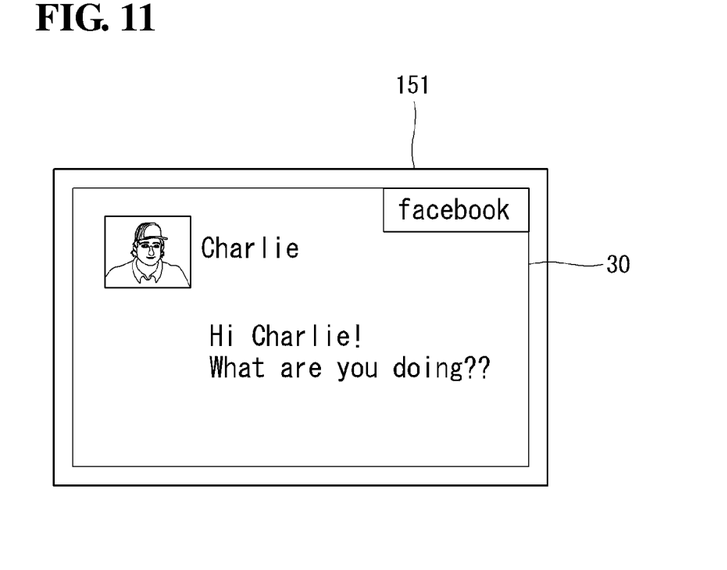

FIG. 9 is a flowchart illustrating a method of controlling a mobile terminal according to a third embodiment of the present invention and FIGS. 10 and 11 are views for explaining the method of controlling a mobile terminal according to the third embodiment of the present invention.

The method of controlling a mobile terminal according to the third embodiment of the present invention may be implemented in the mobile terminal 100 described with reference to FIG. 1. The method of controlling a mobile terminal according to the third embodiment and operations of the mobile terminal 100 to implement the same will now be described in detail with reference to drawings. The third embodiment may be based on the first embodiment of the present invention.

Referring to FIG. 9, the controller 180 may receive a signal of selecting a specific icon from the icons displayed on the message creation screen (S300).

The specific icon may be one of the plurality of icons 12a, 12b, 12c, 12d and 12e respectively corresponding to the different message formats.

The type or scheme of the selection signal received in step S300 may differ from that of the selection signal received in step S120 of the above-mentioned first embodiment of the present invention.

For example, the selection signal received in step S120 of FIG. 2 may be a short touch signal and the selection signal received in step S300 may be a long touch signal.

That is, when the user short-touches a specific item from among the plurality of icons 12a, 12b, 12c, 12d and 12e respectively corresponding to the different message formats, the controller 180 may recognize the short touch as an instruction for selecting a message format.

When the user long-touches the specific item, the controller 180 may recognize the long touch as an instruction for performing step S310 which will be described later.

It is assumed that the user long-touches the Facebook icon 12d with a finger, as shown in FIG. 10.

The controller 180 may provide a currently created message which will be displayed at the destination (S310) as a preview when the specific icon is selected in step S300.

Referring to FIG. 11, the controller 180 can display a result 30 of the currently created message which will be transmitted to a web page corresponding to "Charlie" of Facebook according to the operation of the user, illustrated in FIG. 10.

Figure 12:
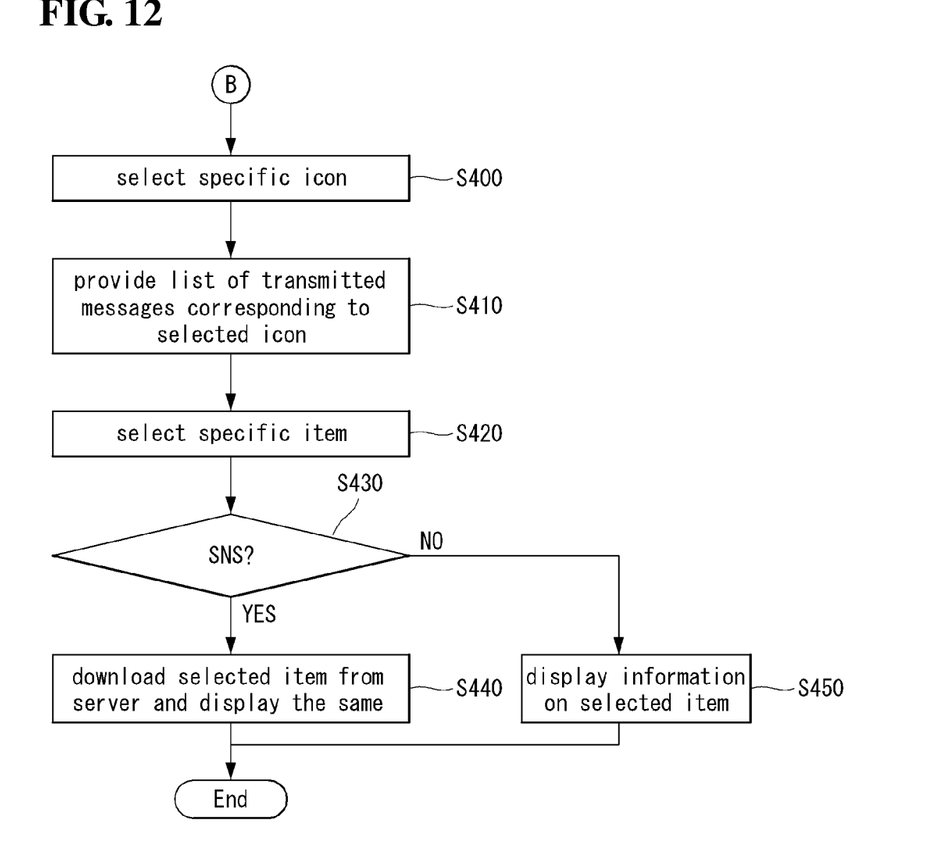
FIG. 12 is a flowchart illustrating a method of controlling a mobile terminal according to a fourth embodiment of the present invention.

FIG. 12 is a flowchart illustrating a method of controlling a mobile terminal according to a fourth embodiment of the present invention and FIGS. 13 to 16 are views for explaining the method of controlling a mobile terminal according to the fourth embodiment of the present invention.

The method of controlling a mobile terminal according to the fourth embodiment of the present invention may be implemented in the mobile terminal 100 described with reference to FIG. 1. The method of controlling a mobile terminal according to the fourth embodiment and operations of the mobile terminal 100 to implement the same will now be described in detail with reference to drawings.

Figure 13:
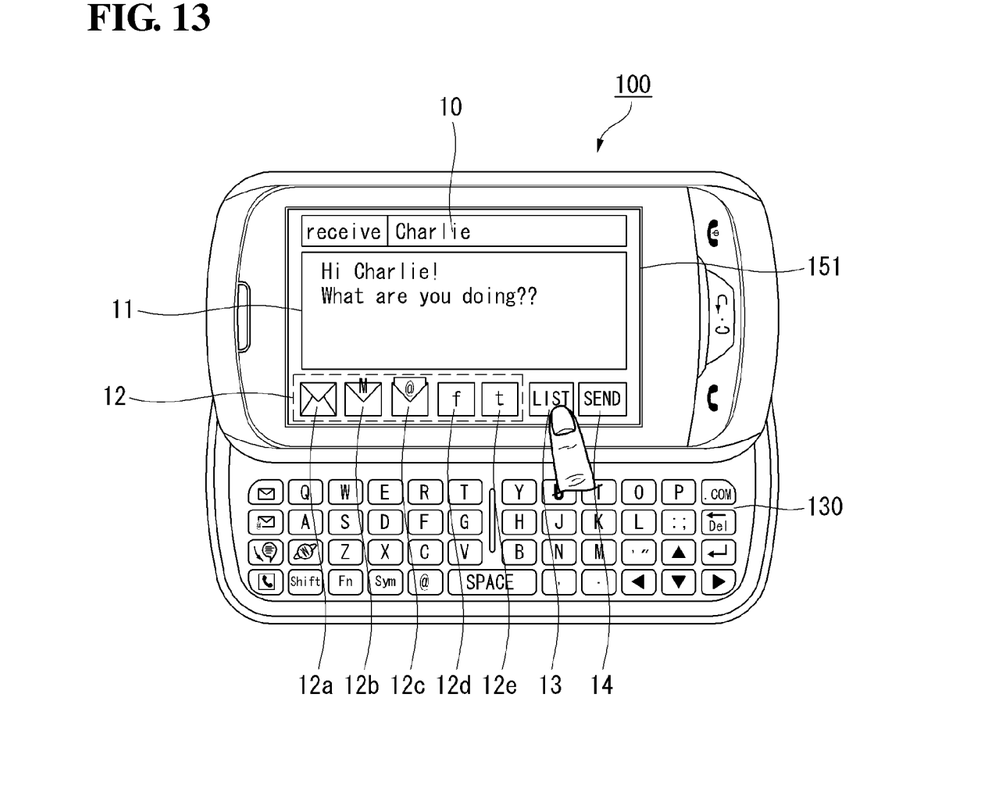
FIGS. 13 to 16 are views for explaining the method of controlling a mobile terminal according to the fourth embodiment of the present invention.

Referring to FIG. 12, the controller 180 may receive a signal of selecting a specific icon displayed on the message creation screen, for example, the list icon 13 (S400). FIG. 13 shows a case in which the list icon 13 is selected.

While an embodiment of displaying the list icon 13 on the message creation screen is described, the present invention is not limited thereto.

For example, the selection signal in step S400 may be a touch applied to a specific icon from among the plurality of icons 12a, 12b, 12c, 12d and 12e respectively corresponding to the different message formats.

Here, the type or scheme of the signal of selecting a specific icon from the plurality of icons 12a, 12b, 12c, 12d and 12e, received in step S400, may differ from that of the selection signal received in step S120 of the above-mentioned first embodiment of the present invention and the selection signal received in step S300 of the second embodiment of the present invention.

For example, when the selection signal received in step S120 of FIG. 2 may be a short touch signal and the selection signal received in step S300 may be a long touch signal, the selection signal received in step S400 may corresponds to two short touches applied to a specific icon from among the plurality of icons 12a, 12b, 12c, 12d and 12e.

The schemes (or types) of the selection signals received in steps S120, S300 and S400 are not limited to the above description. The selection signals received in steps S120, S300 and S400 may be differently set and are not limited to a specific example.

The controller 180 may display a list of transmitted messages corresponding to the specific icon on the touchscreen 151 (S410).

For example, when the currently selected message format corresponds to the SNS message format, the controller 180 can display a list of transmitted messages having the SNS message format on the touchscreen 151 when the list icon 13 is selected as described in FIG. 13.

Figure 14:
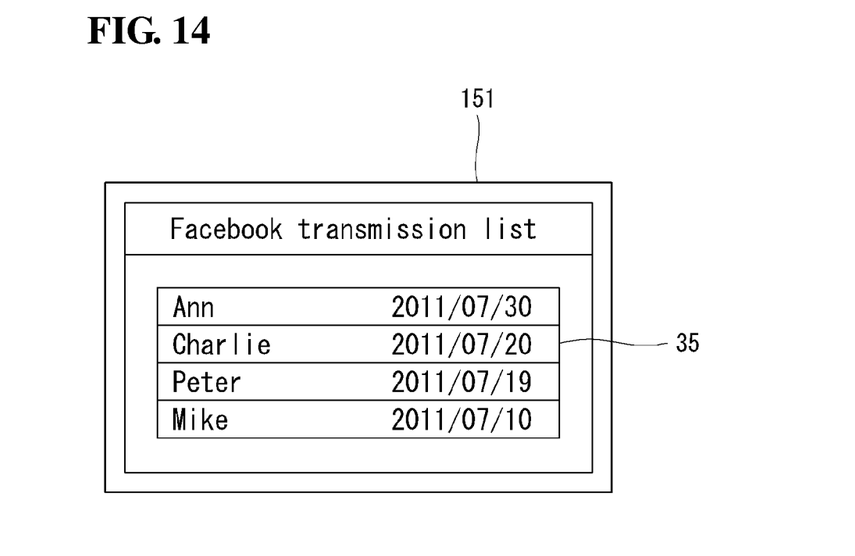

FIG. 14 shows an example of a list 35 of transmitted messages having the SNS (Facebook in the present embodiment) message format.

When the currently selected message format corresponds to the SNS message format, if a specific icon from among the plurality of icons 12a, 12b, 12c, 12d and 12e is short-touched twice, the controller 180 can display a list of transmitted messages having a message format corresponding to the specific icon on the touchscreen 151.

The controller 180 may receive a signal of selecting a specific item included in the list of transmitted messages while the list of transmitted messages having the specific message format is displayed on the touchscreen 151 (S420).

The controller 180 checks whether the selected specific item corresponds to the SNS message format (S430). When the selected specific item corresponds to the SNS message format, the controller 180 may download the item selected in step S420 from a corresponding server and display the item on the touchscreen 151 (S440).

Figure 15:
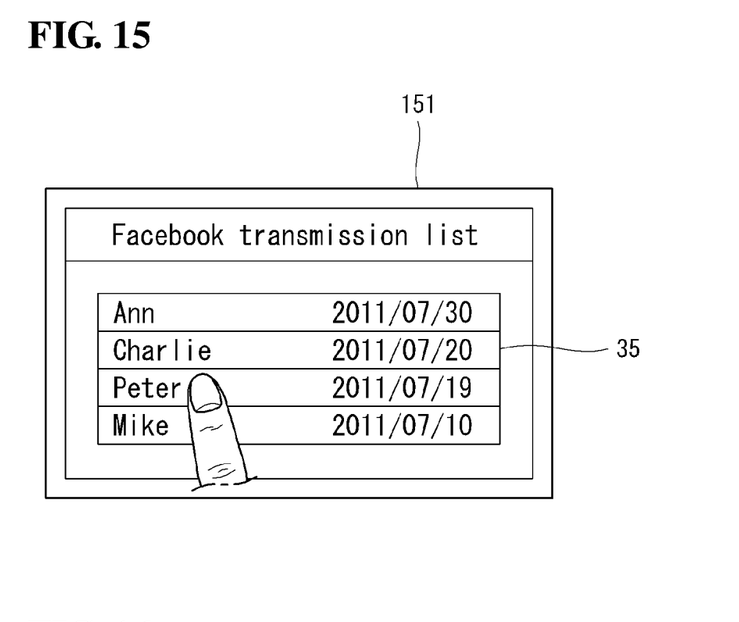

Referring to FIG. 15, the user can select a specific item "Peter" from a list of transmitted SNS messages.

Figure 16:
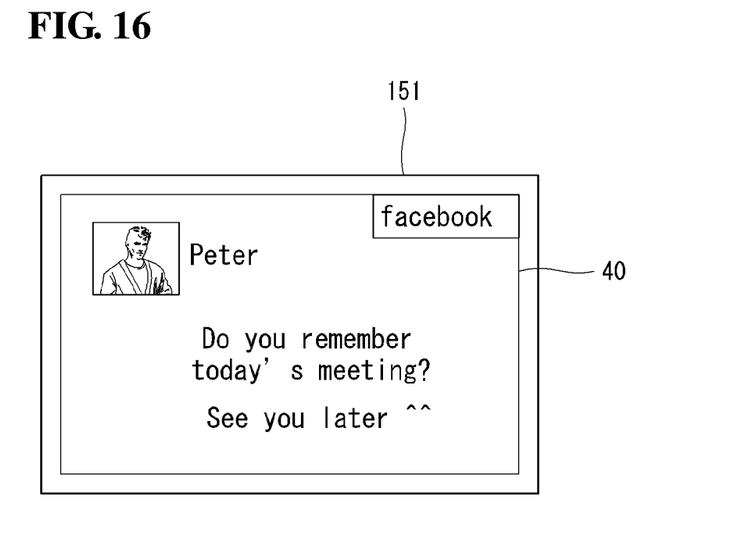

The controller 180 may access Facebook to download content 40 corresponding to the selected specific item "Peter" and display the content 40 on the touchscreen 151, as shown in FIG. 16, upon selection of the specific item "Peter".

That is, the content 40 shown in FIG. 16 is a message in the SNS (Facebook in the current embodiment) message format, which has been sent to "Peter" by the user of the mobile terminal 100.

If the specific item selected in step S420 does not correspond to the SNS message format, information about the selected item, for example, transmission time, a destination such as a receiving part or an Internet address, etc. may be displayed on the touchscreen 151 in step S450.

The user may input information on a specific receiving part registered in a contact book to the destination input window 10.

The controller 180 may display only at least one icon corresponding to destination information corresponding to the specific receiving part, from among the plurality of icons 12a, 12b, 12c, 12d and 12e, on the message creation screen.

For example, if destination information on the specific receiving part input by the user, which is stored in the contact book, does not include SNS information, the SNS icons 12d and 12e are not displayed on the message creation screen.

The method of controlling a mobile terminal may be written as computer programs and may be implemented in digital microprocessors that execute the programs using a computer readable recording medium.

The method of controlling a mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that may store data and may be read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems such that the computer readable code is stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal comprising:
a touchscreen; and
a controller configured to cause the touchscreen to:
display a first message creation screen for creating a message to be transmitted to a specific destination;
display a plurality of icons on the first message creation screen while the message is created on the first message creation screen, each of the plurality of icons corresponding to a different message format; and
display a message capacity for each of the plurality of icons in a format associated with a corresponding one of different message formats while the message is created such that the displayed message capacity is changed according to an amount of the created message on the first message creation screen,
wherein:
the plurality of icons include a first icon corresponding to a first message format and a second icon corresponding to a second message format; and
the message capacity is displayed in a first format for the first message format and in a second format for the second message format, the second format being different from the first format, such that a number of formats for displaying the message capacity corresponds to a number of the plurality of icons.

2. The mobile terminal of claim 1, wherein:
the controller is further configured to cause the touchscreen to display a second message creation screen corresponding to one of the plurality of icons in response to a first touch input received while the first message creation screen is displayed;
the first touch input is for selecting the one of the plurality of icons; and
the second message creation screen is displayed in a specific message format corresponding to the one of the plurality of icons to allow a function that is associated with the specific message format.

3. The mobile terminal of claim 2, wherein the controller is further configured to cause the touchscreen to display a list of transmitted messages in the specific message format corresponding to the selected one of the plurality of icons.

4. The mobile terminal of claim 3, wherein when the selected one of the plurality of icons corresponds to a social networking service (SNS) format and a message item is selected from the list of transmitted messages, the controller is further configured to cause downloading of the selected message item from an SNS providing server and cause the touchscreen to display the selected message item.

5. The mobile terminal of claim 2, wherein:
the controller is further configured to cause the touchscreen to display a preview of a message created on the second message creation screen in response to a second touch input received while the second message creation screen is displayed;
the second touch input is received via the one of the plurality of icons and is for displaying the preview that shows the message to be displayed at the specific destination when the message created on the second message creation screen is transmitted to the specific destination; and
the first touch input and the second touch input are different types of inputs.

6. The mobile terminal of claim 1, wherein the specific destination corresponds to an Internet address or a phone number corresponding to a short message system (SMS) message, a multimedia messaging system (MMS) message, an instant message (IM), a social network system (SNS) message, or an e-mail.

7. The mobile terminal of claim 1, wherein when the specific destination is input on the first message creation screen, the controller is further configured to cause the touchscreen to display at least one icon associated with the specific destination that is stored in the mobile terminal.

8. The mobile terminal of claim 1, wherein the displayed message capacity comprises a first value indicating the amount of the message created via the first message creation screen such that the first value increases as the amount of the created message increases.

9. The mobile terminal of claim 8, wherein the displayed message capacity further comprises a second value indicating a capacity limit corresponding to a maximum amount of the message that can be created via the first message creation screen.

10. The mobile terminal of claim 1, wherein:
the controller is further configured to change the format of the message from a first format to a second format when the message capacity for the message exceeds a first capacity limit for the first format; and
a second capacity limit for the second format is greater than the first capacity limit.

11. A mobile terminal comprising:
a touchscreen; and
a controller configured to cause the touchscreen to:
display a first message creation screen for creating a message to be transmitted to a specific destination;
display a plurality of icons each corresponding to a different message format on the first message creation screen;
display a second message creation screen corresponding to one of the plurality of icons in response to a first touch input received while the first message creation screen is displayed, wherein the first touch input is for selecting the one of the plurality of icons and the second message creation screen is displayed in a specific message format corresponding to the one of the plurality of icons to allow a function that is associated with the specific message format;
display a preview of a message created on the second message creation screen in response to a second touch input received while the second message creation screen is displayed, wherein the second touch input is received via the one of the plurality of icons and is for displaying the preview that shows the message to be displayed at the specific destination when the message created on the second message creation screen is transmitted to the specific destination; and
display a message capacity via the first or second message creation screen, wherein:
the message capacity is displayed for each of the plurality of icons in a format associated with a corresponding one of the different message formats when the message is created via the first message creation screen; and
the message capacity is displayed for the one of the plurality of icons in a format associated with the specific message format when the message is created via the second message creation screen.

12. The mobile terminal of claim 11, wherein the message capacity is not displayed for remaining icons among the plurality of icons when the message is created via the second message creation screen.

13. The mobile terminal of claim 11, wherein the message capacity is displayed for all of the plurality of icons when the message is created via the first message creation screen on which no specific message format has been selected via the plurality of icons.

14. A method of controlling a mobile terminal, the method comprising:
displaying a plurality of icons on a first message creation screen while a message to be transmitted to a specific destination is created on the first message creation screen, each of the plurality of icons corresponding to a different message format; and
displaying a message capacity for each of the plurality of icons in a format associated with a corresponding one of different message formats while the message is created such that the displayed message capacity is changed according to an amount of the created message on the first message creation screen,
wherein:
the plurality of icons include a first icon corresponding to a first message format and a second icon corresponding to a second message format; and
the message capacity is displayed in a first format for the first message format and in a second format for the second message format, the second format being different from the first format, such that a number of formats for displaying the message capacity corresponds to a number of the plurality of icons.

15. The method of claim 14, further comprising:
displaying a second message creation screen corresponding to one of the plurality of icons in response to a first touch input received while the first message creation screen is displayed,
wherein the first touch input is for selecting the one of the plurality of icons and the second message creation screen is displayed in a specific message format corresponding to the one of the plurality of icons to allow a function that is associated with the specific message format.

16. The method of claim 15, further comprising displaying a list of transmitted messages in the specific message format corresponding to the selected one of the plurality of icons.

17. The method of claim 16, wherein when the selected one of the plurality of icons corresponds to a social networking service (SNS) format and a message item is selected from the list of transmitted messages, the method further comprises downloading the selected message item from an SNS providing server and displaying the selected message item.

18. The method of claim 15, further comprising:
displaying a preview of a message created on the second message creation screen in response to a second touch input received while the second message creation screen is displayed,
wherein the second touch input is received via the one of the plurality of icons and is for displaying the preview that shows the message to be displayed at the specific destination when the message created on the second message creation screen is transmitted to the specific destination, and
wherein the first touch input and the second touch input are different types of inputs.

19. The method of claim 14, wherein the specific destination corresponds to an Internet address or a phone number corresponding to one of a short message system (SMS) message, a multimedia messaging system (MMS) message, an instant message (IM), a social network system (SNS) message, or an e-mail.

20. The method of claim 14, further comprising displaying at least one icon associated with the specific destination that is stored in the mobile terminal when the specific destination is input on the first message creation screen.

21. A method of controlling a mobile terminal, the method comprising:
displaying a plurality of icons each corresponding to a different message format on a first message creation screen for creating a message to be transmitted to a specific destination;
displaying a second message creation screen corresponding to one of the plurality of icons in response to a first touch input received while the first message creation screen is displayed, wherein the first touch input is for selecting the one of the plurality of icons and the second message creation screen is displayed in a specific message format corresponding to the one of the plurality of icons to allow a function that is associated with the specific message format;
displaying a preview of a message created on the second message creation screen in response to a second touch input received while the second message creation screen is displayed, wherein the second touch input is received via the one of the plurality of icons and is for displaying the preview that shows the message to be displayed at the specific destination when the message created on the second message creation screen is transmitted to the specific destination; and
displaying a message capacity via the first or second message creation screen, wherein:
the message capacity is displayed for each of the plurality of icons in a format associated with a corresponding one of the different message formats when the message is created via the first message creation screen; and
the message capacity is displayed for the one of the plurality of icons in a format associated with the specific message format when the message is created via the second message creation screen.

22. The method of claim 21, wherein the message capacity is not displayed for remaining icons among the plurality of icons when the message is created via the second message creation screen.

23. The method of claim 21, wherein the message capacity is displayed for all of the plurality of icons when the message is created via the first message creation screen on which no specific message format has been selected via the plurality of icons.

* * * * *